No. 11,996.
Reissued May 27, 1902.
A. I. JACOBS.
COMBINED SPOOL HOLDER AND TENSION DEVICE FOR SEWING MACHINES.
(Application filed Mar. 7, 1902.)
2 Sheets—Sheet 1.
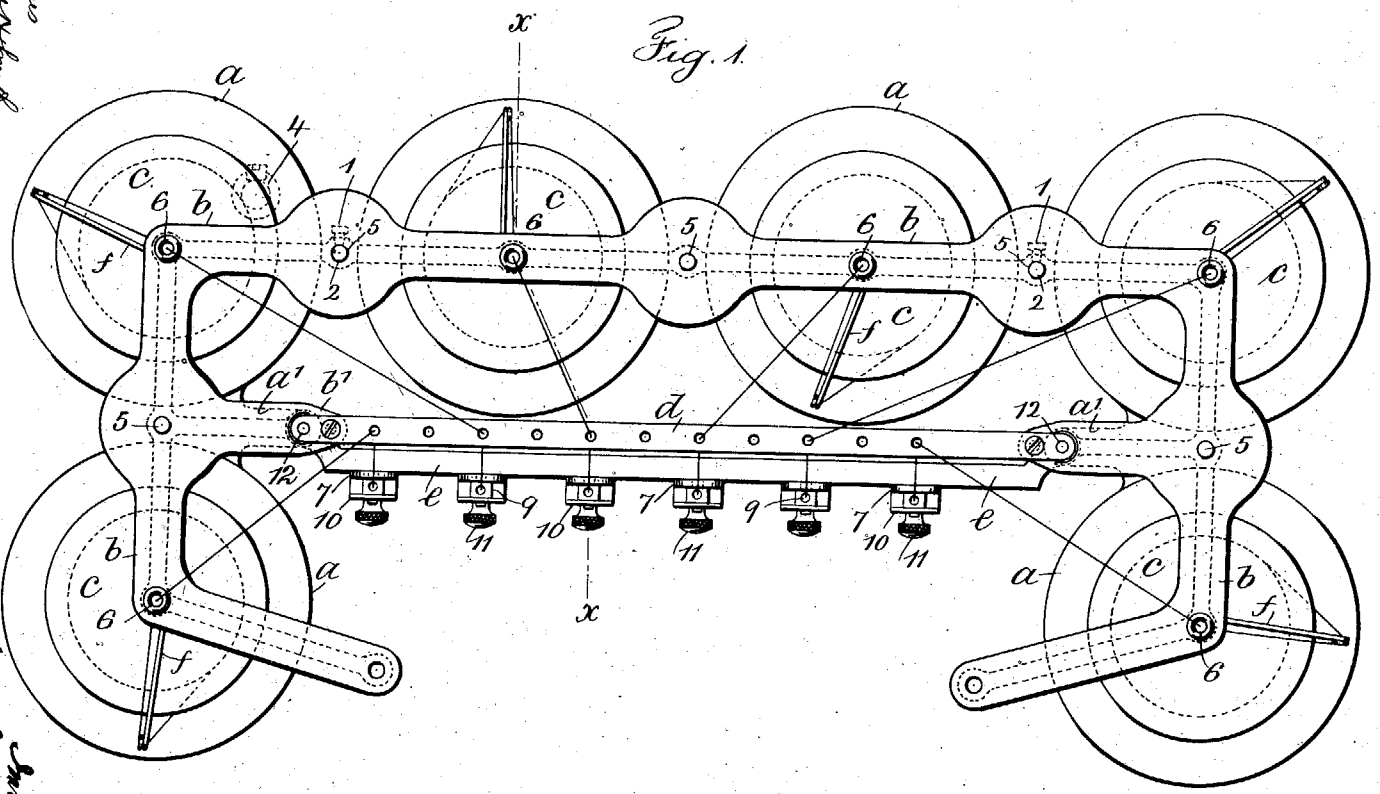
Witnesses
Chas. H. Smith
J. Stair
Inventor.
Arthur I. Jacobs
Per L. W. Serrell & Son
Attys No. 11,996. Reissued May 27, 1902.
A. I. JACOBS.
COMBINED SPOOL HOLDER AND TENSION DEVICE FOR SEWING MACHINES.
(Application filed Mar. 7, 1902.)
2 Sheets—Sheet 2.
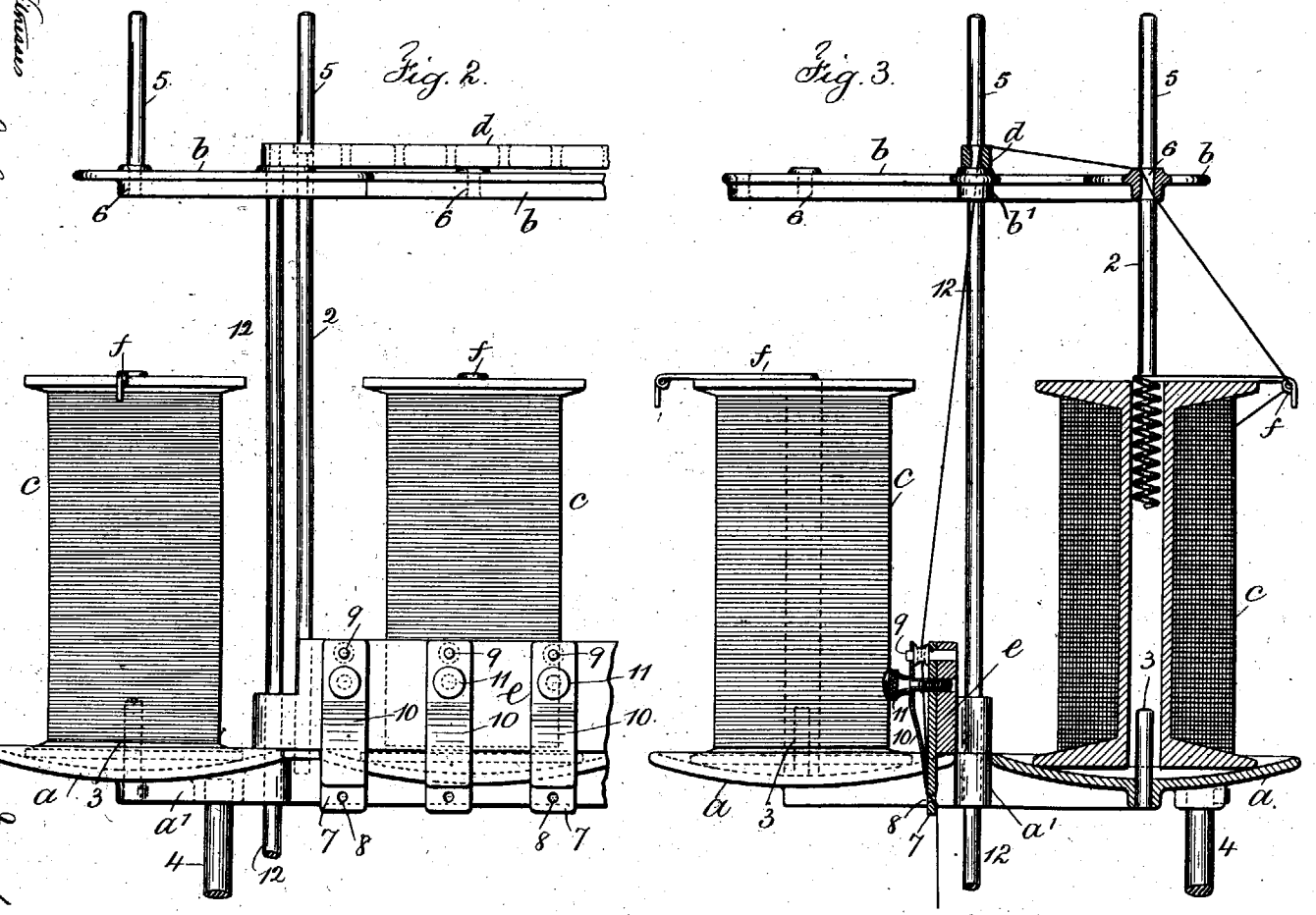
Witnesses
Chas. H. Smith
J. Stair
Inventor
Arthur I. Jacobs
per L. W. Serrell & Son Attys.

UNITED STATES PATENT OFFICE.

ARTHUR I. JACOBS, OF HARTFORD, CONNECTICUT, ASSIGNOR TO THE SMYTH MANUFACTURING COMPANY, OF HARTFORD, CONNECTICUT, A CORPORATION OF CONNECTICUT.

COMBINED SPOOL-HOLDER AND TENSION DEVICE FOR SEWING-MACHINES.

SPECIFICATION forming part of Reissued Letters Patent No. 11,996, dated May 27, 1902.

Original No. 689,038, dated December 17, 1901. Application for reissue filed March 7, 1902. Serial No. 97,207.

*To all whom it may concern:*

Be it known that I, ARTHUR I. JACOBS, a citizen of the United States, residing at Hartford, in the county of Hartford and State of Connecticut, have invented an Improvement in a Combined Spool-Holder and Tension Device for Sewing-Machines, of which the following is a specification.

My invention relates to the class of devices employed for supporting spools or bobbins of thread upon sewing-machines and from which devices the threads are taken and passed through tension devices and to the needles of the sewing-machine, and these sewing-machines are those specially employed in connection with bookbinding.

The object of my invention is to simplify and make more effective such devices.

I employ a main or base plate, a top plate, and standards rising from the main or base plate and supporting the top plate. These plates are preferably in the form of three sides of a rectangular figure. The main or base plate supports the spools or bobbins, and a bar carrying the tension devices is supported closely adjacent to said base-plate, and the top plate is made with eyes for the threads, and said top plate carries a bar also having eyes for the threads, and I prefer to employ flier-arms in connection with the spools or bobbins, so that the threads therefrom pass through the flier-arms, up through eyes in the top plate, across and down through eyes in the bar supported by the top plate, through the tension devices in the bar supported adjacent to the main or base plate, and on to the needles of the sewing-machine.

My improved device possesses a number of advantages over and above devices heretofore employed, as heretofore it was necessary to reach over the parts to get at the separate elevated tension devices, while with my improvement the tension devices are not only close to the needles, which is advantageous, but they are all together and directly in front of the operator, where they may be reached without contact with the other parts of the mechanism. The tension devices are not only grouped together advantageously, but the threads draw direct therefrom to the needles, and said tension devices are lower down than heretofore and therefore are nearer the operator and more accessible.

In the drawings, Figure 1 is a plan view representing my improvement. Fig. 2 is a partial elevation at one end, and Fig. 3 is a cross-section and partial elevation at $x\ x$ of Fig. 1.

$a$ represents the main or base plate, which is advantageously arranged as three sides of a rectangular figure, and said plate is preferably a casting composed of a number of connected circular portions or disks, each having a concave or depressed upper face, and upon the under side of the plate there is a rib or web to strengthen the same. There is a pin 3 at the center of each depression, and the spools or bobbins set over these pins and rest upon the depressed portions of said plate. The top plate $b$ is also preferably a casting and has a rib or web upon its under side to stiffen the same, and said plate $b$ is supported by standards 2 from the main or base plate $a$ and is advantageously clamped in position by set-screws 1.

$c$ represents the spools or bobbins, carried by the main or base plate, the device being preferably supported upon the sewing-machine by a post 4.

The base-plate $a$ is provided with arms $a'$, extending centrally toward one another, their ends being perforated. The top plate $b$ is advantageously provided with a series of pins 5, rising therefrom and adapted to carry other and auxiliary spools, two of the pins 5 being prolongations of the standards 2 above the top plate $b$. I provide eyes 6 in the top plate $b$, agreeing in number with and directly over the center of the spools or bobbins. The top plate $b$ is provided with arms $b'$, that are above and over the arms $a'$ of the bed-plate and are similarly perforated. A bar $d$, parallel with the long member of the top plate $b$, extends between the arms $b'$ and is connected to the top plate $b$, as hereinafter described. This bar $d$ is provided with eyes, preferably agreeing in number with the number of the eyes 6 plus the number of pins 5. A bar $e$, set edgewise and parallel with the long portion of the main or base plate $a$, is provided with notched or offset ends and supported adjacent to and preferably in contact with said base-plate and is almost directly beneath the bar *d*. I prefer to employ and have shown rods 12, that rise from their support on the sewing-machine and pass upward and through the perforated ends of the arms *a'* and *b'* and through the ends of the bars *d* and *e*, connecting such parts together removably. This bar *e* supports the tension devices, which devices each comprise a plate 7, arranged vertically across one surface of the bar *e* and connected thereto by a thread-guide pin 9, the plate 7 having an eye or opening 8 through the same adjacent to the lower edge. I provide spring-fingers 10, arranged vertically and fitting over the outer ends of the pins 9 and overlying the vertical plates 7, and adjusting-screws 11 pass through the spring-fingers 10 and through the plates 7 into interiorly-threaded openings in the bar *e* to hold the fingers in place and to apply pressure to the said spring-fingers 10, causing their lower free ends to bear upon the surface of the plates 7. I have shown the bar *e* upon the rods 12 directly above the base-plate; but it is obvious that the said bar may be reversed, with the tension devices secured thereto in the position shown. It is also obvious and in the skill and discretion of the mechanic to place the bar *e* just beneath the base-plate upon said rods 12. Either of these discretionary positions for the bar *e* has the sole effect of accommodating the position of the tension devices to a nicety in proximity to the sewing-needles.

I employ flier-arms *f*, each preferably comprising a wire helix to fit into the openings of the spools or bobbins, each helix having an integral arm with an eye at the free end. The threads from the spools or bobbins pass through the eyes at the ends of the flier-arms, upward through the eyes 6 in the top plate, across to and down through the eyes in the center bar *d*, through the eyes in the pins 9 and through the tension devices—that is, between the plate 7 and spring-fingers 10—and through the eyes or openings 8, and so directly away to the needles of the sewing-machine, which are in close proximity thereto.

My combined spool-holder and tension device is specially applicable to the Smyth book-sewing machine and is supported upon the machine above the row of needles, and the arrangement and form given to the tension devices and the other parts adapt the device to set directly above the range of needles of said machine, so that the tension devices are in line with said needles and the threads do not have to pass an appreciable distance from the tension devices to the needles.

I claim as my invention—

1. A combined spool-holder and tension device, comprising a base-plate adapted to support the spools or bobbins, a top plate conforming thereto and having eyes for the threads, and standards for supporting the top plate above the base-plate, tension devices and means for supporting the same adjacent to the base-plate and in line with one another, an independent bar carried by the top plate having eyes for the threads whereby the threads from the spools or bobbins pass up through the eyes in the top plate, down through eyes in the bar supported thereby, through the tension devices supported by the base-plate and so to the needles of the sewing-machine, substantially as set forth.

2. A combined spool-holder and tension device, comprising a main or base plate with spool-supports arranged on three sides of a rectangular figure, a top plate having eyes for the threads and conforming in outline to the base-plate, standards from the base-plate for supporting the top plate, a bar having eyes for threads secured to the top plate parallel with the main portion of the top plate, a bar and means for supporting the same adjacent to the base-plate and substantially beneath the bar carried by the top plate and which latter bar is parallel with the main portion of the base-plate and tension devices in line with one another supported by the bar of the base-plate, substantially as set forth.

3. A combined spool-holder and tension device, comprising a series of connected circular disks arranged on three sides of a rectangular figure and adapted to support the spools or bobbins, standards rising therefrom, a top plate having eyes for the threads and means for supporting the same upon and clamping the same to the standards, pins carried by the top plate, rising above the same and adapted to support auxiliary spools, a center-bar parallel with the longer portion of the top plate and having eyes agreeing in number with the eyes of the top plate plus the number of pins for auxiliary spools, a bar parallel with the longer portion of the base-plate, and means for connecting and supporting the same adjacent to the base-plate and substantially below the bar carried by the top plate and tension devices supported by the latter bar, substantially as set forth.

4. A combined spool-holder and tension device, comprising a series of connected circular disks arranged on three sides of a rectangular figure and adapted to support the spools or bobbins, standards rising therefrom, a top plate having eyes for the threads and means for supporting the same upon and clamping the same to the standards, pins carried by the top plate, rising above the same and adapted to support auxiliary spools, a center bar parallel with the longer portion of the top plate and having eyes agreeing in number with the eyes of the top plate plus the number of pins for auxiliary spools, a bar parallel with the longer portion of the base-plate, and means for connecting and supporting the same adjacent to the base-plate and substantially below the bar carried by the top plate and tension devices supported by the latter bar, said tension devices each comprising a plate 7 with eyes through the same near the lower edge, pins 9 connecting said plates to the aforesaid bar, spring-fingers 10 connected to said pins, and adjusting-screws 11 passing through the spring-fingers into interiorly-threaded holes in the said bar with the free ends of the spring-fingers bearing upon the plate 7, substantially as set forth.

5. A combined spool-holder and tension device, comprising a series of connected circular disks arranged on three sides of a rectangular figure and adapted to support the spools or bobbins, standards rising therefrom, a top plate having eyes for the threads and means for supporting the same upon and clamping the same to the standards, pins carried by the top plate, rising above the same and adapted to support auxiliary spools, a center bar parallel with the longer portion of the top plate and having eyes agreeing in number with the eyes of the top plate plus the number of pins for auxiliary spools, a bar parallel with the longer portion of the base-plate and means for connecting and supporting the same adjacent to the base-plate and substantially below the bar carried by the top plate, and tension devices supported by the latter bar, and flier-arms each comprising a wire helix and integral arm with an eye at the free end, the wire helix fitting into the opening in the spool and the eye at the end receiving the thread from the spool, substantially as set forth.

6. A combined spool-holder and tension device, comprising a base-plate adapted to support the spools or bobbins and having arms extending centrally toward one another, a top plate conforming thereto and having eyes for the threads and arms that also extend toward one another and come over the arms of the base-plate, said arms being perforated at their ends, standards for supporting the top plate above the base-plate, a bar and means for supporting the same adjacent to the base-plate and tension devices supported thereon, a bar carried by the top plate having eyes for the threads, and rods extending vertically through the ends of the arms of the base-plate and top plate and through the ends of the bar carrying the tension devices and the other bar having the eyes whereby said parts are connected together removably, substantially as specified.

Signed by me this 27th day of February, 1902.

ARTHUR I. JACOBS.

Witnesses:
ROBT. H. SCHUTZ,
FRED W. KAESER.